United States Patent Office 2,855,440
Patented Oct. 7, 1958

2,855,440
PRODUCTION OF BORON TRIFLUORIDE ALCOHOLATES

Robert R. Walters and Francis F. Koblitz, Fitchburg, Lawrence Zeldin, Madison, and Peter R. Girardot, Middleton, Wis., assignors to Callery Chemical Company, Pittsburgh, Pa., a corporation of Pennsylvania No Drawing. Application August 4, 1955
Serial No. 526,552

11 Claims. (Cl. 260—606.5)

This invention relates to the production of boron trifluoride alcoholates, both dialcoholates and also boron trifluoride complexes with an alcohol and another complexing agent.

Boron trifluoride ($BF_3$) is useful for various purposes. For instance, it is a valuable catalyst in a variety of reactions examples of which are alkylation, isomerization and polymerization. It is used also to produce diborane ($B_2H_6$) and other boron hydrides by reaction with, for instance, sodium borohydride ($NaBH_4$) or sodium hydride (NaH), typical reactions being:

$$3NaBH_4 + 4BF_3 \rightarrow 2B_2H_6 + 3NaBF_4$$

$$6NaH + 8BF_3 \rightarrow B_2H_6 + 6NaBF_4$$

A major problem economically in the production of diborane according to the foregoing reaction has been the inability to make use of the by-product sodium fluoborate as a source of boron trifluoride, without loss of boron or fluorine. Were that possible the foregoing reactions would be commercially feasible.

Boron trifluoride alcoholates of the lower alkyl alcohols, e. g., the dimethanolate ($BF_3.2CH_3OH$), are converted readily into a variety of other $BF_3$ complexes, or co-ordination compounds, that may be used as such to provide $BF_3$, or as sources of gaseous $BF_3$.

It is among the objects of this invention to provide a method of making boron trifluoride alcoholates from an alkali metal fluoborate that is simple, is easily and safely practiced, makes use of readily available reagents, and is efficient.

Another object is to provide a method of making ternary complexes of boron trifluoride that is simple, easily and safely practiced, and efficient.

Trimethyl borate is a compound that may be produced readily and easily from methanol ($CH_3OH$) and boric acid ($H_3BO_3$), boric oxide ($B_2O_3$) or sodium tetraborate ($Na_2B_4O_7$).

The present invention is based in larged part upon our discovery that boron fluoride complexes with alcohol may be produced easily from alkali metal fluoborates by reaction with a lower alkyl borate and an acid in the presence of a polar solvent in which the reactants are soluble and in which they dissociate.

Fluoborates such as those of lithium and potassium are suitable for this reaction although because of its availability and relatively low cost compared with the other alkali metal fluoborates, sodium fluoborate is preferred. A variety of acids may be used in the practice of the invention such as acetic, oxalic and other fatty acids. For many purposes hydrochloric acid is preferred but other mineral acids may be used likewise although sulfuric and phosphoric acids are undesirable in that they tend to produce ethers rather than the desired complexes, and thus decrease yields or are otherwise disadvantageous.

Various polar solvents are likewise applicable for the purposes of our invention but for most purposes we prefer the lower alkyl alcohols, and suitably the alcohol that is present in the borate ester used. Thus, if the borate be trimethyl borate, then we prefer to use methanol as the solvent.

Considering trimethyl borate and methanol as typical in the practice of the invention, and using hydrochloric acid, the following reaction is representative:

$$3NaBF_4 + 3HCl + B(OCH_3)_3 + 5CH_3OH \rightarrow$$
$$4BF_3.2CH_3OH + 3NaCl$$

In the practice of the invention as just described methyl chloride ($CH_3Cl$) is obtained as a by-product but this is advantageous, economically, since it is a commercial item.

The best results are to be had, according to our experience, with the sodium fluoborate, or other alkali metal fluoborate, in finely divided state, and with excess of alcohol and acid over stoichiometry. The reaction mixture should also be stirred vigorously during the reaction.

As an example, a mixture of 26.4 gm. (0.24 mol) of finely ground $NaBF_4$, 8.32 gm. (0.08 mol) of $B(OCH_3)_3$, and 10 gm. of $CH_3OH$ was stirred vigorously at reflux temperature in a nitrogen atmosphere while adding 66 gm. of solution of HCl in $CH_3OH$ (17.2 gm.—0.47 mol—HCl). The suspension was refluxed 60 minutes with the gaseous products swept by $N_2$ from the flask being collected in liquid nitrogen traps. The gas was identified by vapor pressure measurements and molecular weight as $CH_3Cl$, a yield of 14 percent based on HCl input. The reaction mixture was extracted with $CH_3OH$ and filtered. The filtrate was stripped of solvent and upon vacuum distillation gave a 73 percent yield of $BF_3.2CH_3OH$, B. P. 59° to 62° C., 4 mm., having properties identical with those reported by Meerwein and Pannwitz, 141, J. prakt. Chem., 123 (1934).

The reaction conditions are not critical, and the reaction can be carried out in other ways. For instance, 13.2 gm. $NaBF_4$, 4.16 gm. $B(OCH_3)_3$, and 8.76 gm. HCl in 23.9 gm. $CH_3OH$ were mixed and frozen together in a reaction flask. Upon warming gently for one hour a reaction took place with liberation of $CH_3Cl$. Distillation of the reaction residue gave a 53 percent yield of $BF_3.2CH_3OH$.

As indicated above, the lower alkyl borates and alcohols may be applied similarly.

Boron fluoride dimethanolate is a strongly acidic liquid boiling at 58° to 59° C. at 4 mm. It and other lower alkyl alcoholate complexes may be used for purposes similar to those for which other complexes of boron trifluoride are used, such as the etherates, or as intermediates for use in the preparation of gaseous boron trifluoride.

Although the invention has been described thus far with reference to the us of boron esters, it will be understood that there may be used azeotropes of such esters with the ester alcohol, for instance the azeotrope of trimethyl borate and methanol, thus supplying both the alkyl borate and the solvent.

We have found furthermore that a borate ester is essential to the practice of the invention although it need not be supplied as an initial reactant for we have found likewise that the borate ester may be supplied in the course of the reaction from substances which form it for reaction with the other reactants to form the boron fluoride complex with alcohol. As evidencing the necessity for the presence of a borate ester, reference may be made to one experiment in which 6.8 gm. of borax was heated 18 hours at 110° C. to dry it thoroughly. It was then placed in a reaction apparatus with 33 gm. of dried $NaBF_4$ and 25 gm. of absolute methanol. The mixture was refluxed and stirred as a solution of 15 gm. of hydrogen chloride in 45 gm. of absolute methanol was added. The addition was completed in 30 minutes and refluxing was continued for three hours. The reaction mixture was filtered and the filtrate was distilled. No products containing $BF_3$ were obtained.

In another experiment 33 gm. of dry $NaBF_4$ and 21 gm. of hydrogen chloride in 42 gm. of absolute methanol were heated and stirred 75 minutes at 78° C. The mixture was then filtered and the filtrate was distilled. There was obtained only a 16 percent yield of $BF_3.2CH_3OH$, thus showing that at best only very low yields of the desired complex are obtained in the absence of a borate ester.

On the other hand, the borate ester necessary to product satisfactory yields of the complex may be produced by reaction in the presence of alkali metal fluoborate, acid and solvent, as exemplified by the following two tests.

6.2 gm. of $H_3BO_3$ were dried four hours at 110° C. and placed in a reaction apparatus to which there were added 33 gm. of $NaBF_4$ and 25 gm. of absolute methanol. The resulting mixture was heated to reflux and stirred vigorously while adding 66 gm. of a 0.25 gm./gm. of a solution of hydrogen chloride in methanol. The addition was completed in 20 minutes after which stirring and refluxing were continued during one hour. The reaction mixture was filtered and the solids were washed with absolute methanol. The combined filtrates were distilled with recovery of a liquid boiling at 57° C. at a pressure of 5 mm. Its dioxane derivative melted at 138° to 139° C. These properties showed the product to be $BF_3.MeOH.H_2O$. The yield of this complex was 38 percent.

In another experiment 9.6 gm. of $Na_2B_4O_7.10H_2O$ were heated at 200° C. for 30 minutes with vigorous stirring. 33 gm. of $NaBF_4$ were added and mixing continued. After the mixture had cooled there were added 25 gm. of absolute methanol, with stirring. The mixture was stirred vigorously at reflux as 60 gm. of a 0.25 gm./gm. of a solution of hydrogen chloride in methanol were added, which required 20 minutes. Heating and stirring were then continued one hour. The reaction mixture was then filtered and the solids washed with absolute methanol. Distillation of the combined filtrates yielded a product having characteristics the same as those of the immediately preceding test. In this case the yield of $BF_3.MeOH.H_2O$ was 34 percent.

The last two examples demonstrates not only the possibility of producing $BF_3$ complexes with alcohol by forming methyl borate ester in situ, but also how mixed complexes may be produced instead of the dialcoholate complexes such as exemplified by the first test described hereinabove.

The following experiment showed that only extremely low yields of the desired complexes are obtained when there is not used a reaction medium in which the reactants dissolve and dissociate well. 16.5 gm. of dried and ground $NaBF_4$, 5.2 gm. of $B(OCH_3)_3$, and 50 gm. of dioxane were refluxed and stirred while adding 7.2 gm. of hydrogen chloride in 57 gm. of dioxane. The addition was completed in 30 minutes and heating and stirring were then continued one hour and thirty minutes. The reaction mixture was distilled at reduced pressure with recovery of less than 1 percent of a complex containing $BF_3$ that was believed to be $$BF_3.CH_3OH.C_4H_8O_2$$

The alcoholates can be converted readily, with liberation of methanol, to mixed etherates, e. g. the ethyl ether-alcohol complexes which may then be used for their known purposes, as, for instance, a catalyst. Etherates or ether-alcohol complexes of boron trifluoride may then be reacted with alkaline earth oxides or salts to produce complexes thereof that upon pyrolysis yield gaseous $BF_3$.

The boron trifluoride dialcoholate complex likewise reacts with metallic salts that upon pyrolysis yield boron trifluoride. Thus, as disclosed in a copending application of Walters et al. Serial No. 526,550, filed August 4, 1955, now abandoned, solid complexes may be prepared by treatment of boron trifluoride dimethanolate with alkaline earth salts such as lime, calcium chloride or calcium fluoride, that may be pyrolyzed to produce $BF_3$.

Boron fluoride dialcoholates may be converted also to other useful compounds, e. g., boron fluoride dihydrate, which may be used in various ways to supply $BF_3$, as disclosed in a copending application filed by Francis F. Koblitz, Serial No. 518,654, filed June 28, 1955.

Mixed complexes, such as that with one mole each of alcohol and water of the experiments set forth above, are likewise useful for conversion into other compounds or as $BF_3$ catalysts.

From what has been said it will be understood that the alkyl borate may be formed in situ from a lower alkyl alcohol and boric acid, boric oxide or acid borate salts, i. e., borate salts having a $B_2O_3$ content greater than the metaborate.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of making a boron trifluoride complex with alcohol comprising reacting an alkali metal fluoborate, a lower alkyl borate and an acid selected from the group consisting of lower alkyl acids, oxalic acid and hydrochloric acid in the presence of lower alkyl alcohol as a polar solvent in which they dissolve and dissociate, and separating and recovering the $BF_3$ complex with alcohol thus formed.

2. A method according to claim 1, said acid being used in excess of stoichiometry.

3. A method according to claim 1, said acid being hydrochloric acid.

4. A method according to claim 3, said acid and alcohol being in excess of stoichiometry.

5. A method according to claim 1, said solvent being methanol.

6. A method according to claim 5, said acid being hydrochloric acid, and the acid and methanol being in excess of stoichiometry.

7. A method according to claim 1, said borate being trimethylborate.

8. A method according to claim 1, said borate being supplied in the form of an azeotrope with said lower alkyl alcohol.

9. That method comprising reacting sodium fluoborate, methyl borate, hydrogen chloride and methanol, with the hydrogen chloride and methanol in excess of stoichiometry, and thereby producing $BF_3.2CH_3OH$, and recovering the $BF_3.2CH_3OH$.

10. That method of making a ternary complex of $BF_3$ with alcohol and water comprising providing methyl borate in the presence of methanol, an acid selected from the group consisting of lower alkyl acids, oxalic acid, hydrochloric acid, and an alkali metal fluoborate and thereby producing $BF_3.MeOH.H_2O$ complex, and separating and recovering the complex.

11. A method according to claim 1 in which said lower alkyl borate is formed in situ by reaction between a lower alkyl alcohol and a compound of the group consisting of boric acid, boric oxide and acid borate salts, said acid borate salts being those acid borate salts having a $B_2O_3$ content greater than the $B_2O_3$ content in the corresponding acid metaborate salt.

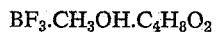

No references cited.